Aug. 28, 1934.  W. A. GIBBONS  1,971,445
METHOD AND APPARATUS FOR MANUFACTURE OF ELASTIC THREAD
Filed Feb. 5, 1932  2 Sheets-Sheet 1
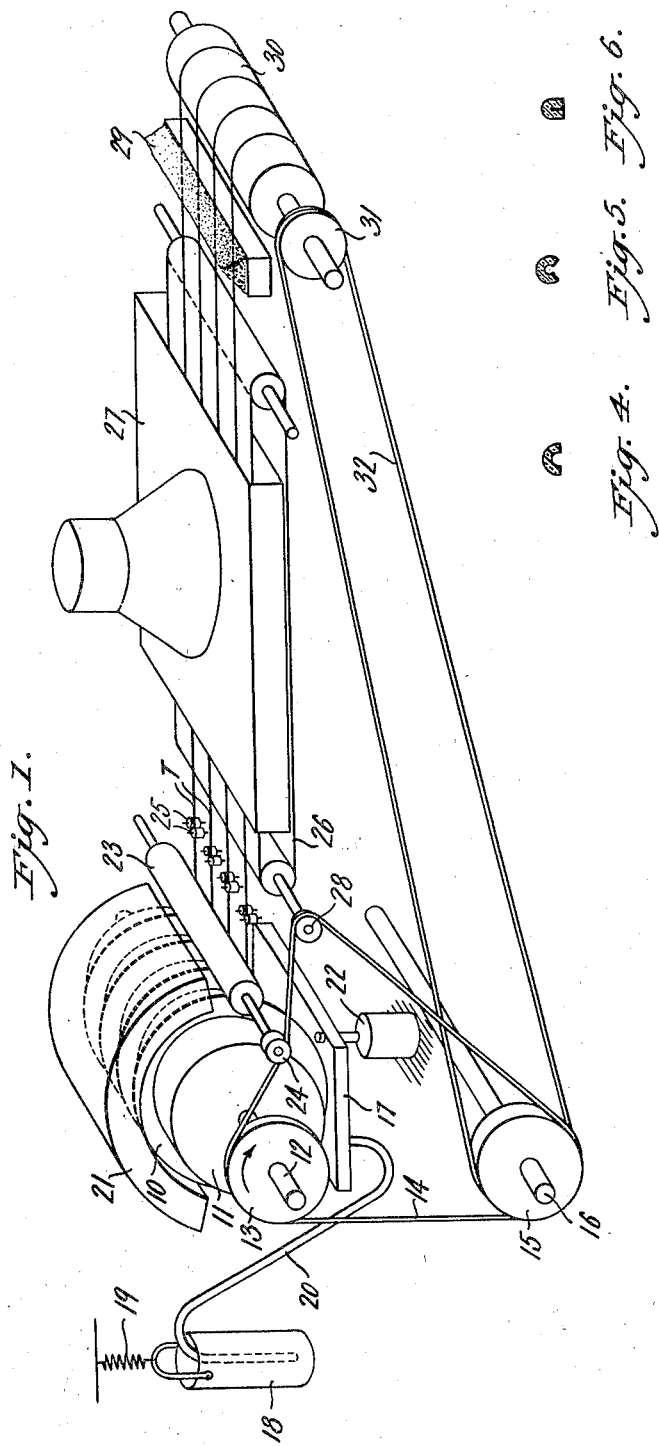
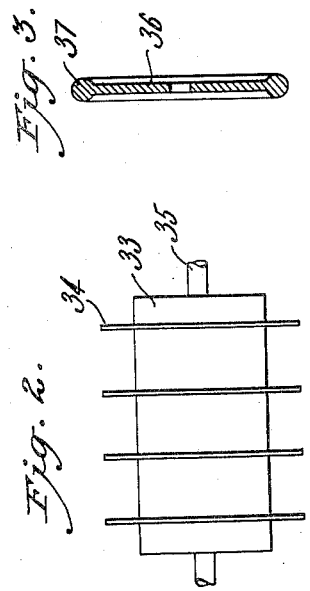
INVENTOR
WILLIS A. GIBBONS
BY Walter L. Pipes
ATTORNEY

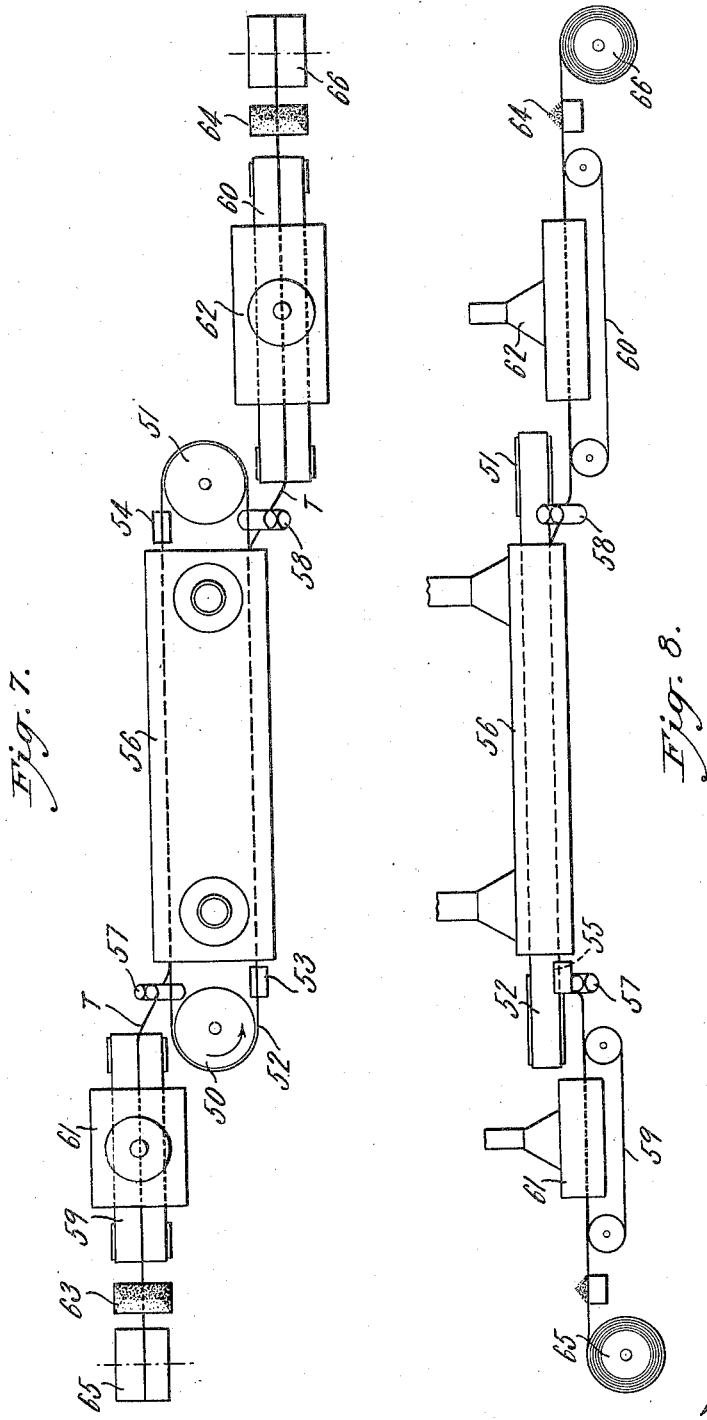

Patented Aug. 28, 1934

1,971,445

UNITED STATES PATENT OFFICE 1,971,445

METHOD AND APPARATUS FOR MANUFACTURE OF ELASTIC THREAD

Willis A. Gibbons, Montclair, N. J., assignor to Revere Rubber Company, Providence, R. I., a corporation of Rhode Island Application February 5, 1932, Serial No. 591,052

13 Claims. (Cl. 18—8)

This invention relates to the manufacture of elastic thread and has for an object the continuous and rapid production of such thread in a simple and inexpensive manner from a suitable rubber-containing fluid, such as solutions or aqueous dispersions of rubber and like materials.

Other objects and advantages will appear from the following description, reference being made to the accompanying drawings illustrating certain present preferred forms of practicing the invention, in which:

Figure 1 illustrates one form of apparatus embodying the invention;

Figs. 2 and 3 show modifications of parts of the apparatus of Fig. 1;

Figs. 4 and 5 are cross sectional views of U-shaped strips before being compacted into a thread;

Fig. 6 is a cross sectional view of the arcuate or U-shaped strips of Figs. 4 and 5 compacted into a thread;

Fig. 7 is a top view of another form of the apparatus embodying the invention; and Fig. 8 is a side view of the apparatus of Fig. 7.

Referring to Figure 1, circular discs 10 separated by spacers 11 and mounted on a shaft 12 are made to rotate in a clockwise direction, as shown by the arrow, by means of a pulley 13 on the shaft 12 driven by a belt 14 from pulley 15 on driving shaft 16 which may be connected to a motor or driven by other means (not shown). Beneath the rotating discs 10 is placed a tank 17 which contains the rubber-containing fluid and in which the discs are submerged to the depth desired. The tank 17 is supplied from a constant head regulating device 18, suspended by spring 19 and which is connected to the supply 18 by means of tube or pipe 20. An overflow 22 may be provided for the tank 17, if desired.

The discs 10 rotating to the desired depth in the tank 17 containing the rubber-containing fluid, pick up on their edge surface a film of rubber which is dried during the rotation of the discs for example by means of a heater 21. The dried or partially dried strips of rubber are pulled off the discs 10 and under guide roll 23 by nip rolls 25 driven in any desired manner. The guide roll 23 may be driven by the pulley 24 and belt 14. The strip of rubber as it is pulled off the discs is in the form of a U-shaped strip as shown in detail in Figure 4 and after passing through the rolls 25, is compacted to a substantially solid thread as shown in Fig. 6.

The compacted threads T pass from the rolls 25 on to a belt 26 travelling through a heater 27 at temperature sufficient to vulcanize the threads. The belt 26 may be driven from a pulley 28 and belt 14 or in any convenient way. The vulcanized threads after leaving the heater 27 are passed through talc or like material 29 and wound up on one or more spools 30 which may be driven through pulley 31 by belt 32 connected to the driving shaft 16.

Figure 1 shows a series of circular discs separated from one another by spacers 11. The discs attached to shaft 12 may be replaced by a cylinder of metal 33 so cut at the edges that it is provided with fins 34 which are an integral part of the center structure. A shaft 35 may be provided for rotating the cylinder similar to shaft 12 of Figure 1.

The apparatus of Figs. 1 and 2 produce a non-planar, U-shaped strip, as shown in Fig. 4, which when compacted appears as a substantially solid thread, as shown in Fig. 6.

Figure 3 illustrates a modified type of disc 36 having a heavy bead edge 37. This type of disc produces a strip having a circular curvature of somewhat more than 180° as shown in Figure 5. When compacted after passing through guide roll 23 and through nip rolls 25, a substantially solid thread similar to the thread made by compacting the U-shaped strip of Figure 4 as shown in Figure 6, is produced. If desired, a second horizontal roll beneath guide roll 23 may co-operate therewith to make a pair of nip rolls for compacting the strips, and in such case, the series of vertical rolls 25 may be omitted.

In Figures 7 and 8 are shown a different type of apparatus utilizing, however, the same principle as the apparatus of Fig. 1. In this apparatus, the edge of a thin tape rather than a thin disc is utilized for forming the arcuate or non-planar strip of rubber which is compacted to form the solid thread.

In the apparatus illustrated by Figures 7 and 8, two sheaves 50 and 51 are provided around which travels a thin tape 52 preferably made of metal. The tape 52 passes through tanks 53 and 54 provided with slots 55. The tanks contain the rubber containing fluid and the slots regulate the height to which the rubber-containing fluid adheres to the strip.

As the tape leaves the sheaves 50 and 51 and tanks 53 and 54 at each end of the apparatus, it enters a drier 56 which has a function similar to the drier 27 of Fig. 1. The film adhering to the edge surface of the strip is dried or partially dried and removed by means of nip rolls 57 and 58 in the form of U-shaped strips, as shown in Fig. 4. The rolls 57 and 58 compact the U-shaped strip removed from the tape in the form of a substantially solid thread T as shown in Figure 6.

The compacted threads T pass from the nip rolls 57 and 58 to belts 59 and 60 passing through heaters 61 and 62 respectively which vulcanize the compacted thread. The vulcanized thread is passed through talcers 63 and 64 and on to wind-up rolls 65 and 66.

Various modifications of the apparatus as shown will readily be apparent to persons skilled in the art. In the apparatus shown in Figs. 1 and 7, the rubber containing fluid applied to the edge surface of the discs or tapes by immersing the latter to a carefully adjusted distance in tanks containing the rubber containing liquid, for example, an alternative method of applying the rubber containing fluid to the traveling edge surface, may be accomplished by the use of a grooved roll or disc for applying the rubber containing fluid to the edge surface of the disc or tape. The grooved roll or disc might rotate in a bath of rubber containing fluid to any desired depth and the disc or tape may be so mounted that its edge travels in the groove at the same linear speed as the bottom of the groove. In this way a band of uniform width at the edge surface of the tape may be applied. The rubber containing fluid which is applied to the traveling edge surface may be a solution of rubber in organic solvent, or an aqueous dispersion of rubber, such as natural or artificial latex, or an aqueous dispersion of synthetic material resembling rubber. In the embodiments shown, the rubber deposit is vulcanized, but if a rubber containing fluid which is prevulcanized or which does not contain vulcanizing ingredients is used, the heat of the driers need only be sufficient to dry the deposit before removal in the form of a continuous thread.

In the operations of both forms of apparatus shown in the accompanying drawings, the rubber containing fluid is supplied to the traveling edge surface of a thin tape or disc and dried on the surface. The thickness of the disc or tape and the width of the band deposited on the edge surface thereof determine the size and shape of the finished thread. The dried or partially dried film of rubber is removed from the traveling edge surface in the form of a strip non-planar or arcuate or U-shaped in cross sectional view, compacted between rolls, and vulcanized in a compacted form.

While the invention has been described more or less in detail, it is not intended thereby to so limit the invention, inasmuch as the examples herein set forth are merely illustrative thereof and various modifications may be made without departing from the invention, the scope of which is indicated in the following claims.

Having thus described my invention, what I claim and desire to protect by Letters Patent is:

1. In the method of making elastic thread, the steps of applying a rubber-containing fluid to a travelling edge surface, and forming a solid rubber deposit from said fluid on said edge surface, and removing said rubber deposit from said surface in the form of a continuous length.

2. In the method of making elastic thread, the steps of applying a rubber-containing fluid to a thin travelling edge surface, forming a rubber deposit therefrom adapted to be removed from said travelling surface in the form of a continuous strip non-planar in cross sectional view, removing the strip, and compacting the strip into the form of a substantially solid thread.

3. In the method of making elastic thread, the steps of applying a rubber-containing fluid to a travelling edge surface, forming a rubber deposit therefrom adapted to be removed from said travelling surface in the form of a continuous strip substantially U-shaped in cross section, removing the strip, and compacting it into the form of a substantially solid thread.

4. The method of making elastic thread comprising applying an aqueous dispersion of rubber to the edge of a traveling edge surface, drying the dispersion, removing the dried deposit in the form of a continuous strip substantially arcuate in cross sectional view, compacting the strip into the form of a substantially solid thread, and vulcanizing said thread.

5. In the method of making elastic thread, the steps of forming a rubber strip non-planar in cross sectional view directly from an aqueous dispersion of rubber, and compacting the strip to form a substantially solid thread therefrom.

6. In the method of making elastic thread, the steps of forming a continuous rubber strip substantially U-shaped in cross sectional view, and compacting the strip in the form of a substantially solid thread.

7. In the method of making elastic thread, the steps of forming a continuous strip of solids deposit of an aqueous dispersion of rubber substantially U-shaped in cross sectional view, and compacting the strip to form a substantially solid thread therefrom.

8. In the method of making elastic thread, the steps of forming a continuous rubber strip substantially arcuate in cross sectional view, and compacting the strip to form a substantially solid thread therefrom.

9. In an apparatus for the manufacture of elastic thread, a thin travelling edge surface, means whereby a rubber-containing fluid may be applied to said edge surface, means for forming a solid rubber deposit from said fluid on said edge surface, and means associated with said surface adapted to withdraw rubber in the form of a continuous length therefrom.

10. In an apparatus for the manufacture of elastic thread, a thin travelling edge surface, a tank adapted to contain a fluid through which said edge surface passes, and means associated with said edge surface for drying on said edge surface the fluid adhering thereto.

11. In an apparatus for the manufacture of elastic thread, a thin travelling edge surface, a tank adapted to contain a fluid through which said edge surface passes, means for drying the fluid adhering to said edge surface to form a deposit non-planar in cross sectional view, and means for continuously removing the dried deposit from the edge surface.

12. In an apparatus for the manufacture of elastic thread, a travelling edge surface, a tank adapted to contain a fluid through which said edge surface passes, means for drying the fluid adhering to said edge surface to form a deposit non-planar in cross sectional view, means for continuously removing the dried deposit from the edge surface, and means for compacting the removed deposit in the form of a substantially solid thread.

13. In an apparatus for the manufacture of elastic thread, a thin travelling edge surface, means whereby a rubber-containing fluid may be applied to said edge surface, means for drying the fluid adhering to said edge surface to form a deposit arcuate in cross sectional view, means for continuously removing the dried deposit from the edge surface, means for compacting it in the form of a substantially solid thread, and means for vulcanizing said compacted thread.

WILLIS A. GIBBONS.